US012703197B2

(12) United States Patent
Spee et al.

(10) Patent No.: US 12,703,197 B2
(45) Date of Patent: Aug. 11, 2026

(54) BLOTTING MATERIAL WITH PROFILED REGION, METHOD OF MANUFACTURING SAME, AND USES THEREOF

(71) Applicant: FEI Company, Hillsboro, OR (US)

(72) Inventors: Ivanka Spee, Eindhoven (NL); Jeroen Bresser, Eindhoven (NL); Adrian Koh, Eindhoven (NL); Maarten Kuijper, Eindhoven (NL); Mathijs Petrus Wilhelmus van den Boogaard, Eindhoven (NL)

(73) Assignee: FEI Company, Hillsboro, OR (US)

( * ) Notice: Subject to any disclaimer, the term of this patent is extended or adjusted under 35 U.S.C. 154(b) by 965 days.

(21) Appl. No.: 17/850,068

(22) Filed: Jun. 27, 2022

(65) Prior Publication Data

US 2022/0410615 A1 Dec. 29, 2022

(30) Foreign Application Priority Data

Jun. 25, 2021 (EP) .................................... 21181790

(51) Int. Cl.

*B43L 17/02* (2006.01)
*G01N 3/06* (2006.01)
*G02B 21/26* (2006.01)

(52) U.S. Cl.

CPC .............. *B43L 17/02* (2013.01); *G01N 3/068* (2013.01); *G02B 21/26* (2013.01)

(58) Field of Classification Search

CPC ...................................................... G02B 21/26
USPC ........................................................... 34/95.1
See application file for complete search history.

(56) References Cited

U.S. PATENT DOCUMENTS 5,147,522 A * 9/1992 Sarrine ............ G01N 27/44782 204/616
8,164,072 B2 * 4/2012 Lihl ..................... G01N 1/2813 250/311
2016/0245732 A1 8/2016 Remigy

FOREIGN PATENT DOCUMENTS

| | | | | |
|---|---|---|---|---|
| CN | 104730291 B | * 12/2017 | | |
| EP | 2381236 A1 | 10/2011 | | |
| EP | 3786608 A1 | * 3/2021 | ........... | G06V 20/693 |
| JP | 2020520080 A | * 7/2020 | ............ | H01J 37/265 |
| JP | 2022550838 A | 12/2022 | | |
| WO | 2021/067940 | 4/2021 | | |
| WO | WO-2021067940 A1 | * 4/2021 | ............... | G01N 1/42 |

OTHER PUBLICATIONS

English Translation of CN 104730291-B (Year: 217).*
English Translation of JP 2020-520080 A (Year: 2020).*
EP Application No. 21181790, Extended Search Report issued Dec. 23, 2021.

* cited by examiner

*Primary Examiner* — Connor J Tremarche

(57) ABSTRACT

The present invention describes a blotting material comprising a profiled region that has a portion configured to protrude at least partially into a space created within a boundary formed by the rim of a holder for a sample grid. Also described are methods for making such profiles and components used to make said profiles. There are also provided methods for removing excess liquid from a sample grid by bringing the profiled blotting material into association with the sample grid past the sample grid holder. Systems comprises means to hold a sample grid holder, means to hold the blotting paper, and means to bring the two together are also described.

6 Claims, 9 Drawing Sheets

BLOTTING MATERIAL WITH PROFILED REGION, METHOD OF MANUFACTURING SAME, AND USES THEREOF

BACKGROUND OF THE INVENTION

There are a number of techniques used in cellular and structural biology research which employ cryogenic conditions in the sample preparation and analysis. Non-exhaustive examples are cryogenic electron microscopy (cryo-EM), single particle analysis (SPA), cryogenic electron tomography (cryo-ET), and micro electron diffraction (MicroED).

Biological specimens (such as cells, cell components, single-cellular organisms, etc.) that need to be stored and studied in a body of aqueous liquid (such as water, electrolyte, cell fluid, blood plasma, etc.) can present significant challenges vis-à-vis their examination in a CPM, since. an aqueous liquid introduced into a (quasi-)vacuum environment of a CPM will start to outgas/boil, thus tending to degrade the specimen. In order to prevent this, a sample (specimen+aqueous liquid) can first be frozen before being introduced into said vacuum. However, so as to prevent damage to the specimen caused by the formation of (sharp) ice crystals, such freezing must generally be performed very rapidly, with the aim of achieving sample vitrification (solidification into an amorphous, glass-like phase) without significant ice crystallization. In order to facilitate such vitrification—but also to allow the sample to be studied in a transmission-type CPM, such as a TEM—the sample should be relatively thin (sheet-like), but one should still be able to support it by its edges (so that the employed means of support have no significant effect on beam penetration). To this end, use if typically made of a grid-like holder (such as a so-called TEM Autogrid®), across which a perforated membrane (such as a so-called "holey carbon film") is spanned, in whose perforations a small quantity of sample can be held (by surface tension effects).

In the sample preparation phases for such techniques, typically a solution comprising a sample is applied to a grid and the sample is vitrified before analysis. Vitrification forms an amorphous solid that does little to no damage to the sample structure and is a critical technique for cellular and structural biology research where samples are cooled so rapidly that the surrounding water molecules do not have time to crystallize.

There exists a number of devices that aid in the preparation of a sample for cryogenic analyses. One such device is the Vitrobot (ThermoFisher Scientific, Inc.). WO 02/077612 A1 teaches such a device.

In a typical mode of operation a solution containing a sample is applied to a thin grid, excess liquid is blotted away, the sample is vitrified, and the grid with vitrified sample is then loaded (clipped) into a holder (such as a so-called AutoGrid®) ready for microscopic analysis. This technique is used, for example, with Leica plunger devices, where single sided blotting is carried out using flat filter paper on bare unclipped grids. Alternatively, the sample grid is preloaded to a holder and thereafter the sample is added and spread out into a thin layer by a pin, and the sample is vitrified. Only small areas can be covered by this technique. Also it does not work for all sample types, such as cells and crystals.

Both of these methods come with their own problems. For example, for methods where sample is added to the grid before the grid is clipped to the holder, there follows a relatively difficult step of clipping the grid with frozen sample to the holder under LN2-conditions afterwards. In these methods, it would therefore be more helpful to the user to pre-load the grid to the holder prior to vitrification.

However, for methods where the sample and grid are already associated with a holder prior to vitrification, the present inventors have discovered that the resulting geometry of the combined grid and holder presents an undesired situation whereby suitable blotting of any excess liquid from the sample grid is rendered inconsistent.

In this regard, a grid (e.g. sample support disc, typically of approximately 3 mm diameter with thickness of 10-40 μm) clipped in a holder (e.g. autogrid; typically with a primary (front side) opening onto the grid of approximately 2.7 mm diameter) has one of its planar surfaces recessed about 100 μm with respect to the outer front side surface plane of the holder. The distance between the other planar surface of the grid and the back side outer surface plane of the holder can approach almost 300 μm. Such configurations of typical arrangements of sample grids loaded to a holder are depicted in FIGS. 1A and 1B (1=holder; 2=sample grid; 3=front side of sample grid; 4=rear side of sample grid).

The types of blotting paper typically used in these situations are in the form of a sheet, having a planar structure with dimensions larger than that of the sample grid holder. Therefore, when such a piece of blotting paper is brought towards the grid/holder in order to blot excess liquid from the sample grid, it first contacts the outer surface of the holder. The blotting paper is therefore unable to penetrate beyond the outer surface plane of the holder. In effect, a space is created between the grid surface and face of the blotting paper. This situation is depicted in FIG. 1C (5=blotting paper; 6=gap between blotting paper and sample grid).

This in turn makes successful and consistent blotting with flat blotting paper very hard, as no hydrophilic force can be established onto the aqueous sample by the paper. This holds true for front side blotting (where the front side (3) of the mesh support grid is presented to the primary opening of the holder (see FIG. 1A), such as during SPA, while the blotting paper is presented to the primary (front side) opening of the holder) and back side blotting (where the front side (3) of the mesh support grid is presented to the primary opening of the holder (see FIG. 1A), such as during MED and TOMO-cell, while the blotting paper is presented to the secondary (back side) opening of the holder). However, it is also true for blotting an inverted grid from the primary opening (front side) of the holder, in situations where that might be of interest (see FIG. 1B). It should be noted that back side blotting using a pre-clipped grid in a holder is not known until the present invention.

As well as the use of a flat piece of blotting paper typically employed in cryo preparation methods, others have attempted alternative ways of removing excess liquid from sample grids. For example, self-wicking grids have been developed (SPT Labtech) to avoid need to use blotting paper. Yong Zi Tan and John L. Rubinstein ("Through-grid wicking enables high-speed cryoEM specimen preparation", *Acta Cryst*. (2020), D76, 1092-1103) published a method relating to the Back-it-up backside blotting for SPA grids. Moreover, several attempts have been made to wick grids by drying, blowing, or extracting sample away by vacuum, for example Puffalot (WO2018020036A1), shake-it-off ultrasonic method (Rubenstein, et al., *Acta Cryst*. (2019). D75, 1063-1070, "Shake-it-off: a simple ultrasonic cryo-EM specimen-preparation device"), Preassis (doi.org/10.1101/665448: Zhao, et al., "A simple pressure-assisted method for cryo-EM specimen preparation"), blot-free-drying (Arnold, et al., "Blotting-free and lossless cryo-electron microscopy grid preparation from nanoliter-sized protein samples and single-cell extracts", Journal of Structural Biology 197 (2017) 220-226) vacuum-drying from-below (EP3018467A1). However, with particular respect to the various drying techniques, it has been found that the time taken for suitable drying undesirably changes the concentrations within the sample solutions.

There exists a need, therefore, for a more reliable way of removing excess liquid from a sample grid prior to vitrification of the sample. Moreover, vitrification of pre-loaded (pre-clipped) sample grids into a holder prevents risk of grid damage because the need to load the sample grid after vitrification is rendered redundant.

SUMMARY OF THE INVENTION

To this end, the present inventors have discovered that using a piece of blotting paper with a profiled region that has a portion configured to protrude into the part of the holder that opens on to the grid allows that portion of the filter paper to approach the grid surface to a degree whereby excess liquid lying close to the grid surface can be efficiently wicked away. Thus, although the outer surface of the holder (or the plane created along that outer surface) may prevent the major surface of the blotting paper to approach the grid more closely, the profiled region nevertheless allows at least a portion of the blotting paper to perform its intended role.

Since blotting paper is widely available, cheap, and frequently used, the present inventors looked to make use of such material with minimal required manipulation. Blotting paper will typically be received as a planar sheet, with no profiled regions that have intentionally been included on the sheet. And certainly no profiled regions that are intended to allow a portion of the blotting paper to extend into an annulus of a sample grid holder.

BRIEF DESCRIPTION OF THE DRAWINGS

The present invention can be further explained by reference to the figures, in which.

DETAILED DESCRIPTION OF EMBODIMENTS

In conducting their experiments, the present inventors have found that to absorb a typical volume of 2.5 μL excess liquid from a sample grid, an area of approximately 10 mm diameter of blotting paper is consumed. That is significantly larger than the primary (front side) opening area (annulus) of a holder on to the grid, which is typically in a range of approximately 2.5-3.5 mm, such as around 2.7 mm or around 3 mm. In other words, using a small (typically disc shaped) piece of standard blotting paper that has been cut down to fit within the annulus of a sample grid holder will generally not be able to wick away all excess liquid to a desired degree. To enable suitable wicking to occur in such a situation, the piece of blotting paper would need to be at least about 16 times thicker than a standard blotting paper used, like Whatman™ #595, in these types of methods.

Part of the benefit of the present invention is to be able to use materials that are commonplace and cheap rather than having to order or manufacture speciality blotting paper, which can increase cost and require unnecessary additional use of resources. Secondly, as pre-formed profiled papers will likely degrade over time during transport and storage, on the spot creation of fresh profiles is another advantage. Thus, it was a preferred remit to be able to modify existing 'standard' blotting paper and methods commonly used in the field to address the problem(s) of the ability to wick excess liquid and thin it to required thickness under the constraint that the sample grid is already clipped to its holder.

Figures 2A, 2B:
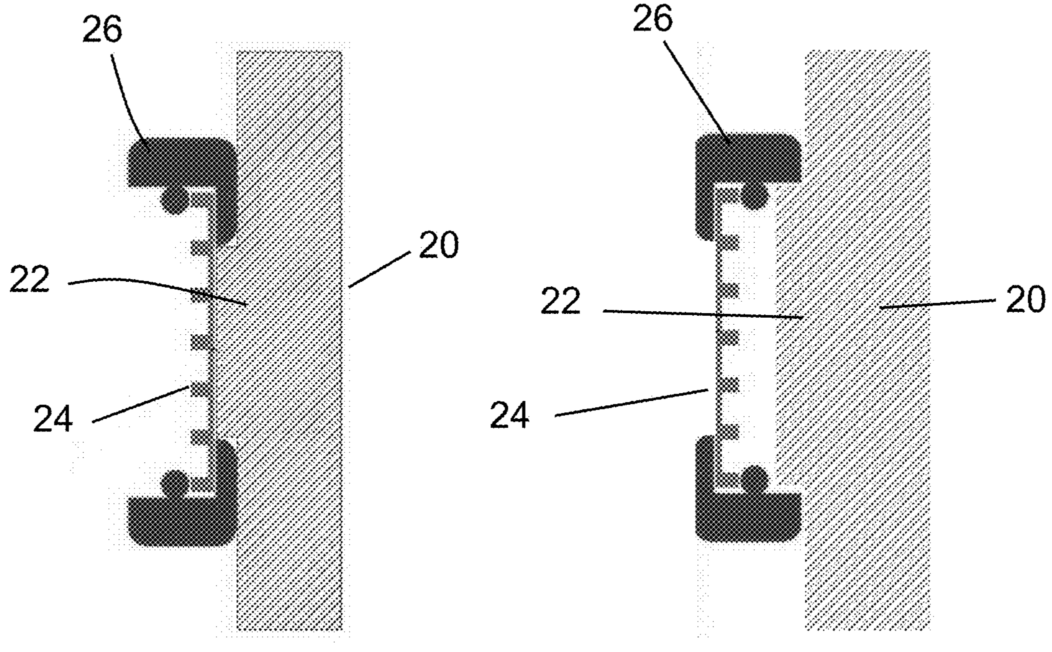
FIG. 2A shows an embodiment of the present invention where the blotting paper comprises a profiled region comprising a protrusion that is able to approach the sample grid from the front side of the holder, despite the remainder of the blotting paper abutting an outer surface of the grid holder.
FIG. 2B shows an embodiment of the present invention where the blotting paper comprises a profiled region comprising a protrusion that is able to approach the sample grid from the back side of the holder, despite the remainder of the blotting paper abutting an outer surface of the grid holder.

To this end, and as depicted in one example of the present invention as shown in FIGS. 2A and 2B, the present inventors have found that creating a profiled region (22) on blotting paper (20) (particularly standard, non-speciality blotting paper) enables a consistent and reliable removal of excess liquid from a sample grid (24) while it is clipped into its holder (26).

The profiled region is one which allows a portion (22) of the blotting paper (20) to approach the surface of the grid (24), even though part of the surface of the blotting paper is held further away from the surface of the grid. Such a distance that the remaining surface (e.g. a non-profiled part) is held away from the sample grid is typically one which could otherwise lead to no or inconsistent removal of the excess liquid from the grid. For example, if the amount of excess liquid on the grid was such that the liquid did not reach to the outer planar surface of the sample grid holder then, if no profiled region existed, there might be no contact made between the blotting paper and the liquid and thus no or insufficient removal of the excess liquid.

Typically part of the blotting paper will be held away from the sample grid by making contact with the outer planar surface of the sample grid holder (26). However, it will be appreciated by the skilled person that such contact is not a necessary requirement of the invention. The proximity of the portion of the profiled region configured to protrude into the annulus of the sample grid holder to the sample grid can be achieved to a suitable degree even if the remaining surface of the blotting paper does not make contact with the sample grid holder.

Having said that, in some arrangements there are potential advantages for the blotting paper to be arranged to contact the outer surface of the holder, as will be discussed in more detail below.

The term "blotting paper" is used throughout this specification. However, this term does not limit the material to a particular type or brand of paper. Instead it is intended to cover any suitable form of absorbent material that can be manipulated to have a profiled region as discussed herein. Thus, the term "blotting material" can equally be used. Typically, useful materials will be planar sheets of suitable absorbent material, typically referred to as "paper". The material will typically be fibrous, as such materials generally have desired absorbance properties. Non-exhaustive examples of blotting materials that can be employed in the present invention are filter paper, glass fiber (typically used in the form of sheets), porous materials, Si-wafer sheets (typically decorated with nano capillary pillars), etc.

Figures 1A, 1B, 1C:
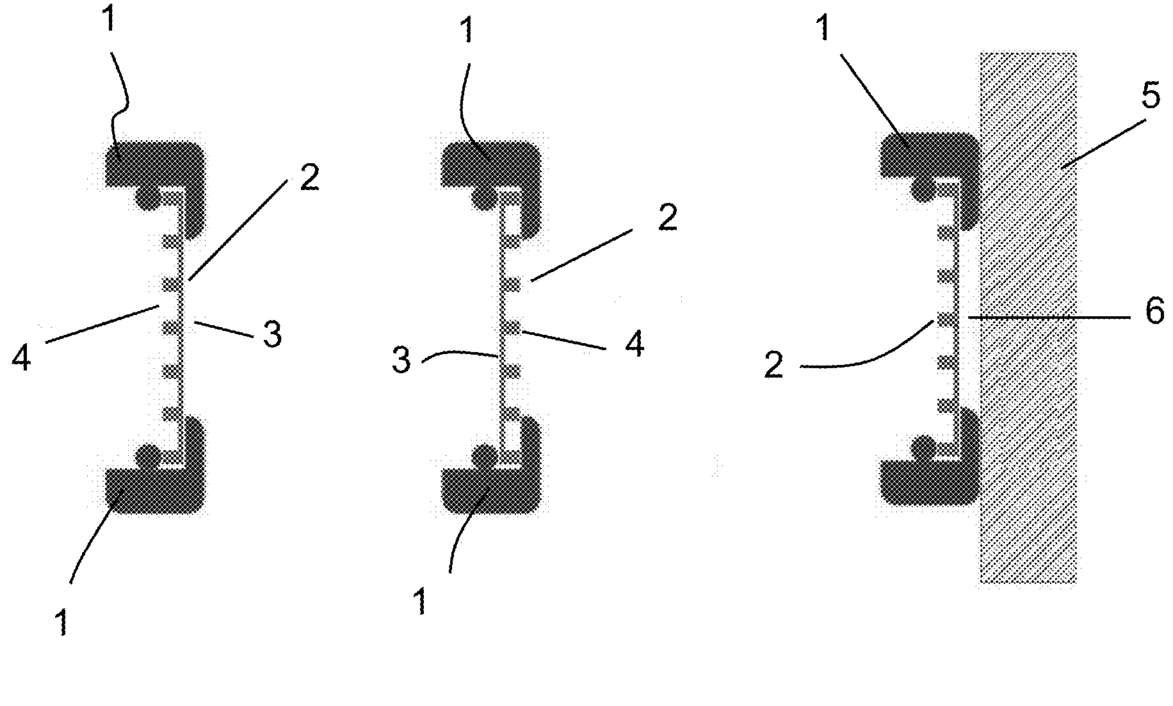
FIG. 1A shows a schematic of a front side mounted sample grid typically used in the industry, with the front side of the grid facing a primary (front side) opening of the grid holder.
FIG. 1B shows a schematic of an inverted sample grid, with the back side of the grid facing a primary (front side) opening of the grid holder.
FIG. 1C depicts a planar piece of blotting paper (without profile) as typically used in the industry to remove excess liquid from a sample grid, highlighting the gap formed between the grid and the blotting paper.

The intended rationale of the profiled blotting paper of the present invention is to have a portion of the paper that at least partially fits inside the annulus of a holder of a sample grid. The annulus is formed by the space residing between the wall(s) of the holder. As depicted in e.g. FIGS. 1A and 1B, the holder will have a front side and a back side annulus. Sample grid holders are typically circular (hence use of the term annulus to refer to the space between the walls), but the invention can be utilised on any shape of holder as long as the blotting paper has a portion that can extend beyond the plane of the outer surface of the holder in order to approach the sample grid more closely than other parts of the blotting paper. Moreover, the wall of the sample grid holder need not be complete; it can have one or more portions comprising a gap in the wall. As will be appreciated, the configuration of the sample grid holder does not affect the use of the profiled blotting paper. Thus, although we use the term "annulus" throughout this description for simplicity, the holder and the profiled region are not limited to a circular profile.

Since the profiled region of the blotting paper is designed so that a portion of the blotting paper can fit at least partially into the space delimited by the wall(s) of the holder, the profiled region will have dimensions that are suitable for such placement. The profiled region can therefore be such that the portion of the blotting paper configured to protrude into the space of the holder is typically equal to or less than approximately 3 mm in diameter (if circular), or equal to or less than approximately 3 mm in its longest dimension (if not circular). Typically the primary front side opening of the holder will be approximately 2.5 mm in diameter, while the secondary rear side opening will be approximately 3 mm in diameter. However, if a larger sample grid holder is being used, then it is possible that the portion of the blotting paper configured to protrude into the space of the holder will likewise be larger. On the other hand, there may be some arrangements where the portion of the blotting paper configured to protrude into the space of the holder is, or is intended to be, smaller than the space/annulus of the sample grid holder. Moreover, alterations in size can also be applied to take into account various tolerances of the alignment margins, etc. Therefore the portion of the blotting paper configured to protrude into the space of the holder can be between approximately 0.5-3.5 mm in diameter (or longest dimension), between approximately 1-3 mm in diameter (or longest dimension), between approximately 1-2.5 mm in diameter (or longest dimension), between approximately 1-2 mm in diameter (or longest dimension). For example, the portion can be between approximately 1.5 mm and 2 mm, approximately 1.7 mm and approximately 2 mm. Optionally the diameter can be between approximately 1.8 mm and 2.0 mm, optionally approximately 1.8 mm, optionally approximately 2.0 mm. The profiled region itself can be larger than the portion of the blotting paper configured to protrude into the space of the holder, since such a region can comprise an indentation to accommodate the peripheral wall of the sample grid holder. Thus, the profiled region may extend to approximately 5 mm in diameter or longest dimension such that the sample grid holder, and optionally the tool holding the sample holder (typically a tweezer tip) is able to nestle inside the profiled region.

The depth of the portion of the blotting paper configured to protrude into the space of the sample grid holder is designed such that the portion extends beyond the plane of the outer surface of the sample grid holder. Typically this will be a depth of approximately 100 μm when the sample grid is arranged to be accessed from the front side of the holder. However, a space of approximately 300 μm can be present between the rear side of the holder and the grid. Thus, the depth of the portion of the blotting paper configured to protrude into the space of the holder can range from approximately 25 μm to approximately 500 μm. Other arrangements can range from approximately 50-400 μm, approximately 50-300 μm, approximately 50-275 μm, approximately 50-250 μm, approximately 50-225 μm, approximately 50-200 μm, approximately 50-175 μm, approximately 50-150 μm, approximately 50-125 μm, approximately 50-100 μm, approximately 50-90 μm, approximately 50-80 μm, approximately 50-70 μm, approximately 50-60 μm, approximately 60-400 μm, approximately 60-300 μm, approximately 60-280 μm, approximately 70-280 μm, approximately 80-280 μm, approximately 90-280 μm, approximately 90-290 μm, approximately 100-300 μm. In certain arrangements, the height of the protrusion can be approximately 100 μm, approximately 125 μm, approximately 150 μm, approximately 275 μm, approximately 300 μm, approximately 350 μm.

Figures 3A, 3B:
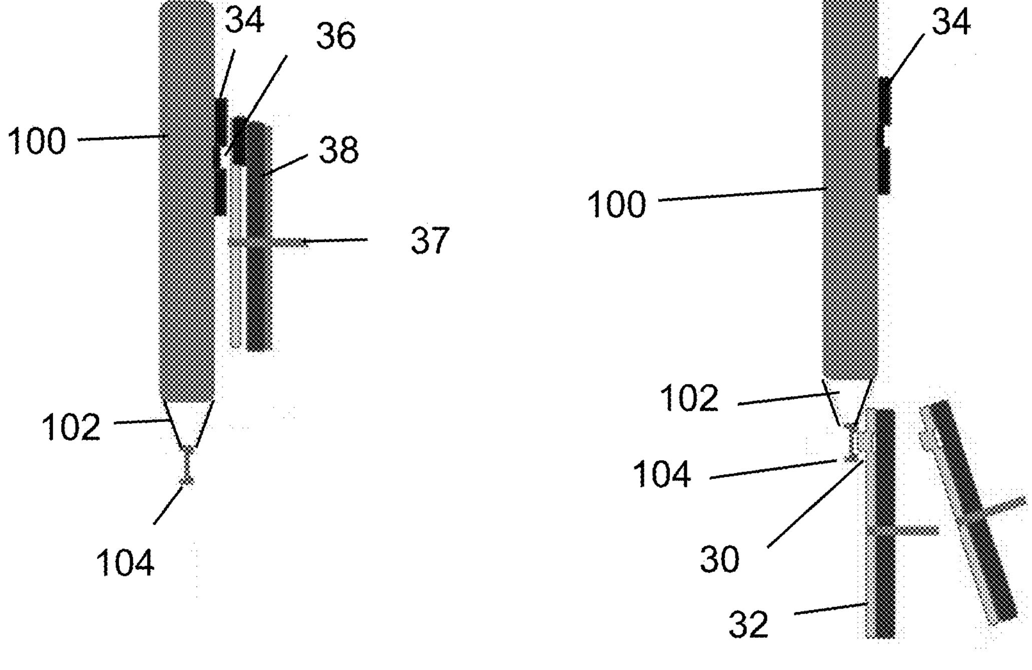
FIG. 3A shows an exemplary template for creating a desired profile in a piece of blotting paper.
FIG. 3B shows an exemplary positioning of a piece of blotting paper having a profile formed by the template of FIG. 3A into a sample grid holder.

In one arrangement, as shown in FIGS. 2A, 2B and 3B, a simple form of profiled region is a single region (30) (e.g. circular region), where substantially the whole of the profiled region comprises an area that protrudes from the major plane of the blotting paper (32). Such a region will look like a bump on the blotting paper.

However, the profiled region need not have the same profile across its area, nor does it need to have a portion that extends from the major plane of the paper towards the grid holder.

Figure 4A:
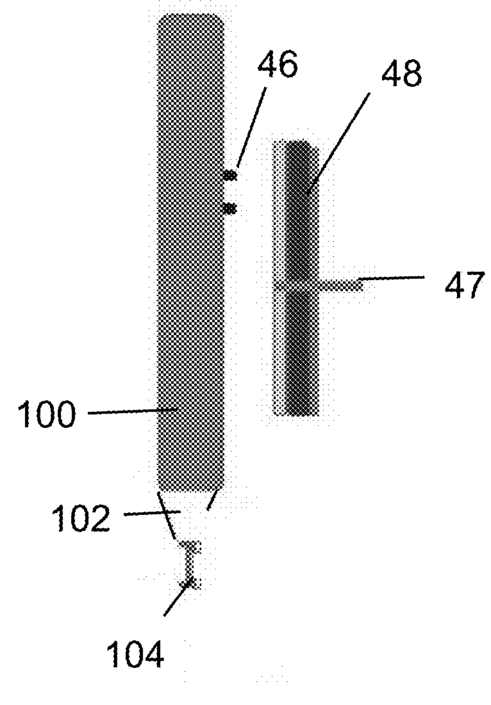
FIG. 4A shows an alternative exemplary template for creating a desired profile in a piece of blotting paper.
Figure 4B:
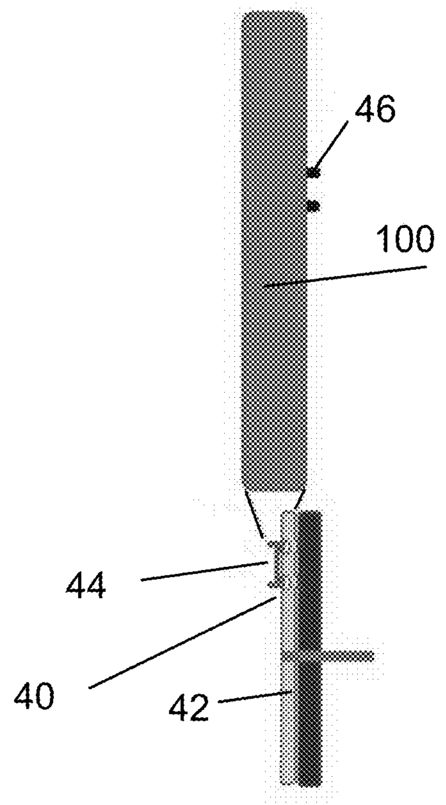
FIG. 4B shows an exemplary positioning of a piece of blotting paper having a profile formed by the template of FIG. 4A into a sample grid holder.

For example, as shown in FIG. 4B, the profiled region in the blotting paper may comprise a peripheral portion (40) that is depressed into the major plane of the paper (42). This leaves the area of the profiled region residing within the bounds of the formed depression (44) as not extending beyond the plane of the remaining part of the blotting paper (42) outside of the profiled region. This peripheral portion (40) of the profiled region is designed such that the outer wall of the sample grid holder is able to fit within the depression, and is therefore dimensioned accordingly. By this manner, the outer wall of the holder can progress past the plane of the surface of the blotting paper. The area of the profiled region residing within the bounds of the formed depression is thereby able to protrude past the plane of the outer surface of the holder and approach the sample grid for effective removal of excess liquid.

Figures 5A, 5B:
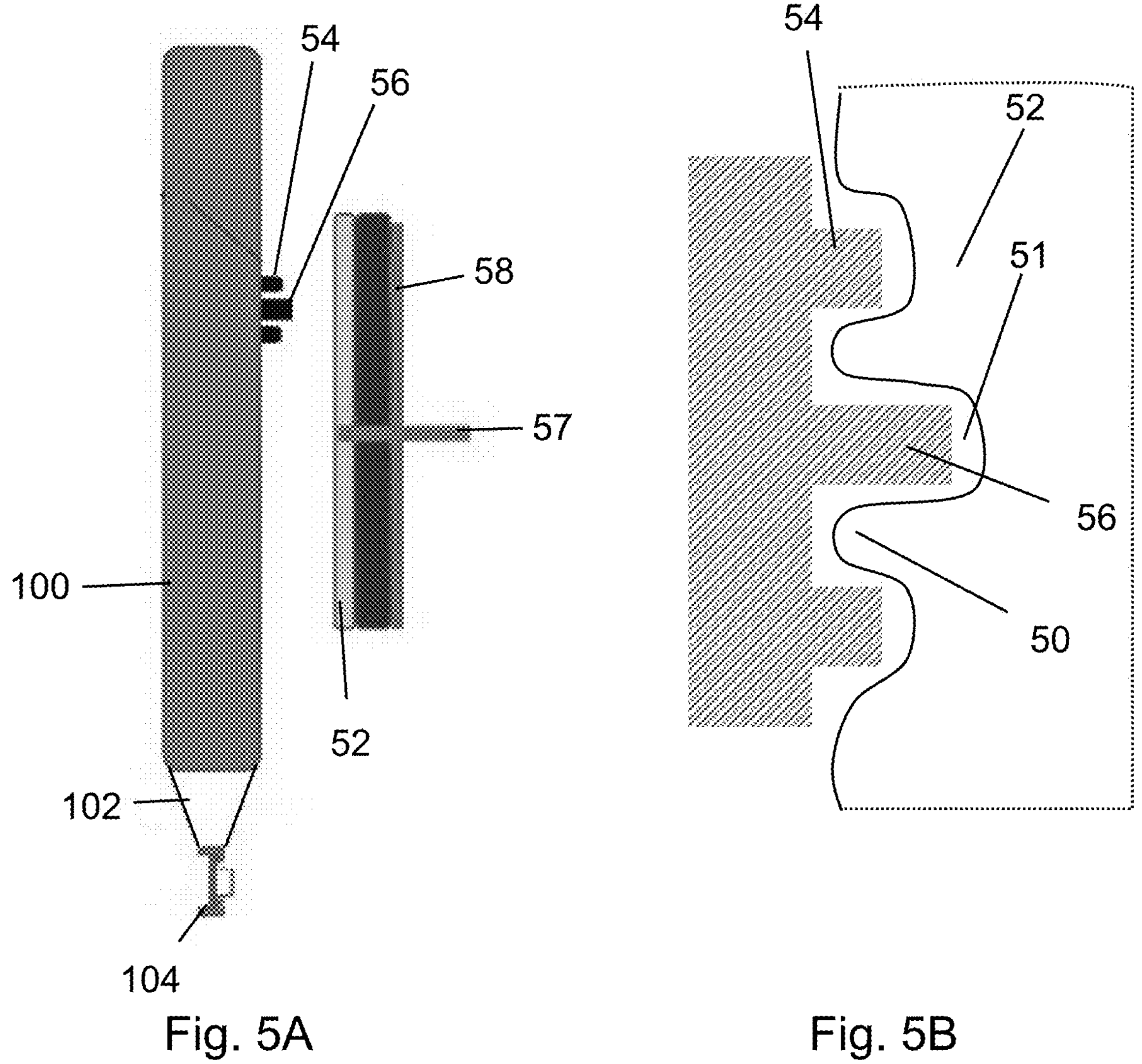
FIG. 5A shows an alternative exemplary template for creating a desired profile in a piece of blotting paper.
FIG. 5B shows an exemplary formation in a piece of blotting paper having a profile formed by the template of FIG. 5A.

Alternatively, and as exemplified in FIG. 5B, a profiled region comprising a protrusion (50) with an indentation (51) can be formed in the blotting paper (52). In effect, this is akin to the formation of a ring having a central recessed portion. In one arrangement the protrusion may extend out from the plane of the blotting paper, such as depicted in FIG. 3B. This protrusion may then have an indentation in its area. Alternatively, the protrusion may be formed as depicted in FIG. 4B, with a peripheral portion (40) that is depressed into the major plane of the paper (42). The protrusion may then have an indentation in its area.

The bottom of the indentation may be at the same level of the blotting plane of the paper outside of the profiled region, or else it may reside at a higher or lower level than the plane of the blotting paper. In such an arrangement, while the outer edges of the protrusion/ring extend into the annulus of the sample grid holder, typically at a position close to or touching the wall of the holder, the inner part of the recessed dimple does not extend into the annulus, or does not extend into the annulus to the same degree. This configuration therefore enables blotting of the sides of a grid (i.e. radial wicking) while leaving a space in a central portion that resides away from the grid, and importantly from any sample on the grid that is located centrally (tending to be the portion of the sample of most interest). This arrangement is particularly useful for large cell or crystal vitrification, where contact of the blotting paper with the sample may damage the sample.

In some arrangements, the portion of the blotting paper configured to protrude into the space of the holder is designed to make contact with the holder wall. This might be particularly useful in ensuring contact with the excess liquid in the sample which might have formed a meniscus up the wall.

As part of each of these profiles, or as alternative arrangements, the portion of the blotting paper configured to protrude into the space/annulus of the holder may have any desired shape and dimensions. This can assist, for example, in creating the ability to alter the wicking process locally over the grid surface by using different shapes of protrusion. This enables the user to improve the wicking process dependent on desired outcome (e.g. Tomo-cell, FIB crystal MED, SPA, etc.). Typically vitrification methods and robots tend to use a single profile of blotting paper irrespective of application. A flat profile for the protrusion is one option but, for example, a slanted edge or trapezoid shape of the protrusion can allow for the creation of a thickness gradient in the liquid layer, as some parts of the blotting paper will approach the grid before other parts and also may ultimately end up residing closer to the grid when the blotting paper is moved to its final blotting position.

As mentioned above, there are potential advantages for the blotting paper to be arranged to contact the outer surface of the holder when the blotting paper and holder are brought into proximity, as well as to have a portion that extends into the annulus of the sample grid holder. The portion that contacts the outer surface of the holder can be part of the profiled region, or can be a portion of the blotting paper planar surface surrounding the profiled region that is left intact (i.e. not profiled) from its original configuration.

Being able to contact the outer surface of the holder supports accurate positioning of the profiled region.

For example, when the blotting paper contacts the outer surface of the holder, it is prevented from approaching the grid and holder any further. This therefore means that the portion of the blotting paper that extends into the holder annulus is also prevented from further insertion. This can therefore reduce the chances of unintended over-insertion into the annulus, which has the potential to damage the grid and/or the sample that is held on the grid.

In effect, the blotting paper comprises a surface that is configured to contact an outer surface of the holder, thereby creating a stop to prevent the portion configured to protrude at least partially into the annulus of the sample grid holder from protruding further.

Figure 7A:
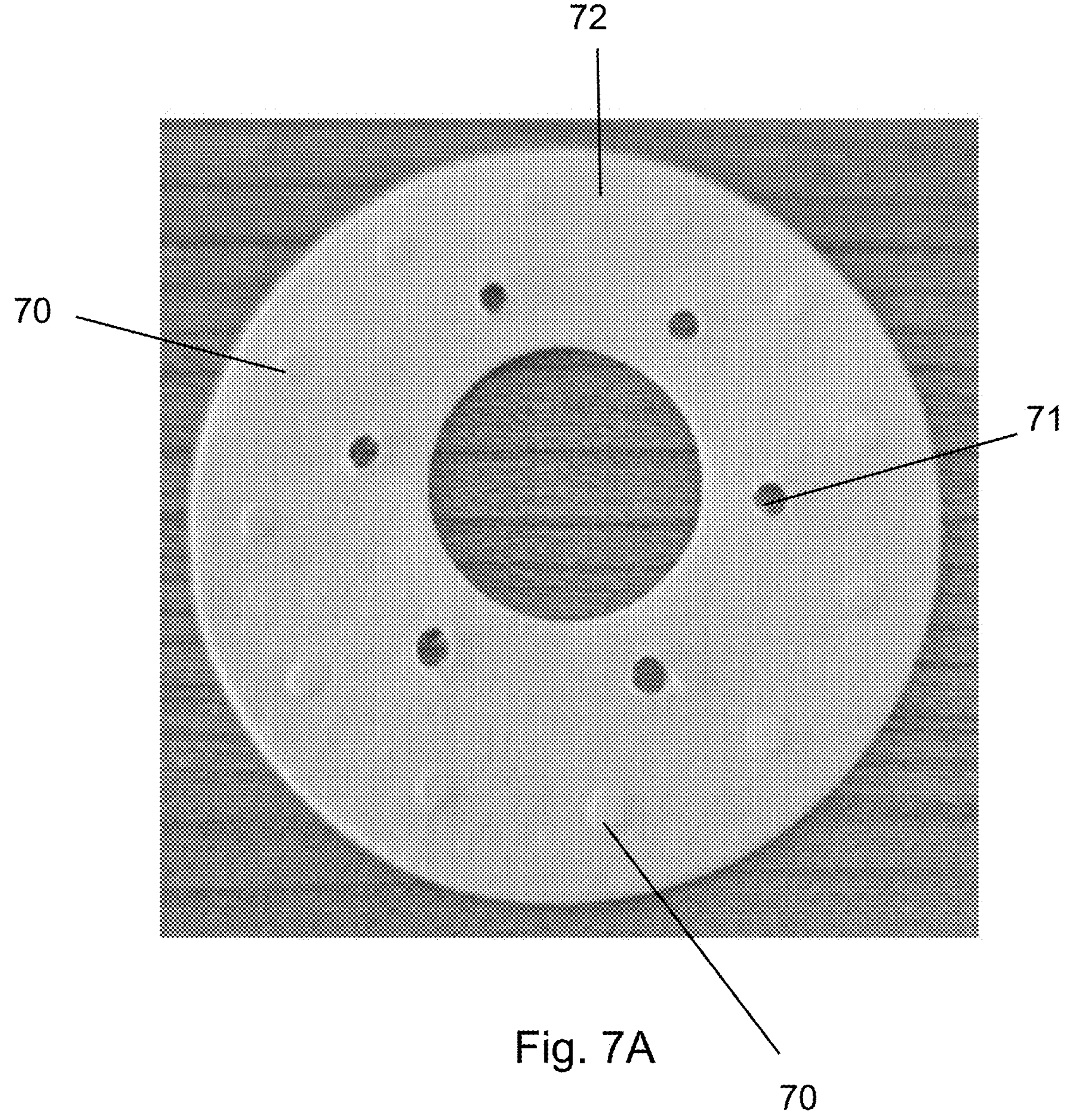
FIG. 7A shows an example of a blotting paper being pre-perforated with alignment holes

While a piece of blotting paper can be used comprising a single profiled region, in general the paper being used is far larger than the sample grid holder. Having a relatively large piece of blotting paper (e.g. approximately 55 mm diameter) allows for easy mounting onto a holder (e.g. blotting arm). In order not to waste resources, therefore, in configurations of the invention the blotting material comprises a plurality of profiled portions. Such a configuration is depicted in FIG. 7A. These profiled portions (70) will typically be spaced apart from one another so that when one profiled region is used for blotting (which, as discussed above, will result in a portion of the blotting material outside of the profiled region from become wet), it does not compromise the integrity of neighbouring profiled regions. In this manner, therefore, in use a single piece of blotting material can be used to blot liquid multiple times before needing replacement. After each time one profiled region is used, the blotting material can be reoriented such that an unused profiled region is presented to the sample grid holder. Typically the blotting material will be in the form of a circular sheet (72). The plurality of profiled regions (70) on the blotting material can vary depending on the size of the piece of blotting material and the size of the profiled region. Typically there may be between 2-20 profiled regions, between 5-20 profiled regions, between 10-20 profiled regions, between 12-18 profiled regions, between 12-16 profiled regions. The profiled portions on the blotting material can be the same as one or more of the other profiled regions, or can be different from one or more of the other profiled regions.

The present disclosure also provides teaching of a means to make a profiled region on a piece of blotting paper as discussed herein, as well as a method of making the same.

There is provided a former for making a profiled region on a piece of blotting paper, the profiled region comprising a portion of the blotting paper that is configured to protrude into the annulus (or any equivalent non-circular space) of a sample grid holder.

As such, the former is designed to impart such a profile to the blotting paper. As is well known to the skilled person, the former will therefore comprise a template with one or more elements that are configured in a complementary arrangement to the desired final profile on the blotting paper (i.e. a mirror image of the desired profile). In this manner, when the former and blotting paper are brought into contact with one another with suitable force, the elements of the former will leave an opposite profile on the blotting paper, which profile is the desired profile for producing a portion of the blotting paper that can extend into the annulus of a sample grid holder.

For ease of description, we refer herein to the primary element(s) of the former that are responsible for creating the profile on the blotting paper as a template. However, the template does not need to be made as a singular entity, and can contain multiple elements arranged in a desired configuration but not directly attached to one another. Moreover, for the sake of brevity, rather than listing out all the dimension of the templates, it is clear that the dimensions of the relevant profiled regions of the template correspond to the dimensions recited above for the parts of the profiled regions that are desired to be present on the blotting paper.

The former can be a stand-alone device. It can be in the form of a stamp. Existing formers can be employed, along with the new templates as disclosed herein to form the desired profiles on the blotting materials. The template may be held in a distinct holding structure. The template holding structure can be designed so that different templates can be arranged in the structure, allowing the same holder to be used to create different profiles. The blotting paper holder and the template/template holding structure can be separate elements. Alternatively the blotting paper holder and the template/template holding structure can be removeably joined to each other. This can be in the form of a hinge mechanism, so that the holder can be brought into contact with the template/template holding structure in a repeatedly reliable manner. Alternatively, the template/template holding structure and blotting paper holder may be arranged such that one or both can move towards each other in a linear motion (such as e.g. using a lever to drive the holder linearly onto the template).

In certain situations, a piece of blotting paper may simply be placed between a template and a pressing part of the former, and the profiled regions are then imparted to the blotting paper by forcing the paper into the template. This typically occurs by the template profile entering a complementary profile on the opposite part of the former.

In the cases where the profiled region is made outside of any sample preparation device (such as the Vitrobot®), the profiled blotting paper may then be introduced to an existing component of a device (such as a pre-existing blotting arm) such that it can be used to blot excess liquid from a sample grid. Alternatively, the profiled blotting paper may be used to blot excess liquid away from the sample grid even while the grid/grid holder has not been loaded into a preparation device.

Thus, exemplary but non-exhaustive arrangements of a template of a former can be as follows. Although the templates in FIGS. 3A, 4A and 5A are shown on an arm of a sample preparation device, this is simply for ease of reference and the invention is not so limited:

1) as shown in FIG. 3A, a template (34) comprising an indentation (36). A single indentation (36) will result in a single protrusion on the blotting paper (see FIG. 3B, item 30). The indentation can be dimensioned to the diameter (if circular, and other dimensions if non-circular) of the desired protrusion. It can comprise a depth that corresponds to the desired height of the protrusion. The indentation can also comprise other configurations (e.g. variation in depth, variation in lateral dimensions) that are desired to be reflected on the profiled portion of the blotting paper. In some arrangements, for example if a central indentation is desired in the blotting paper, the former template can comprise a raised portion (not shown) located within the indentation.

2) as shown in FIG. 4A, a template (46) comprising a peripheral raised portion. The peripheral raised portion can be configured (and located) so that a corresponding indent is formed in the peripheral region of the profiled region on the blotting paper. In the case of a desired circular depression in the blotting paper, the raised portion of the template (46) will also be circular. However, any desired geometry is possible. The raised portion may comprise gaps around the perimeter to mirror any gaps that might be present in the wall of a sample grid holder. The raised portion will therefore create a complementary depression in the blotting paper. The depression in the blotting paper created by the template after suitable pressure has been applied can correspond to the wall of the sample grid holder such that the wall of the holder can fit within the depression, as shown in FIG. 4B. By doing so, the part of the blotting paper residing within the bounds of the depression will be able to protrude into the annulus of the holder (see FIG. 4B, item 44).

3) as shown in FIG. 5A, a template comprising a peripheral raised portion (54) and an additional raised portion (56) residing within that periphery. Such additional raised portion (56) can be substantially centrally located within the periphery. The central raised portion can be of any desired height, for example less, the same, or greater than the height of the peripheral raised portion. The peripheral raised portion (54) acts in the same manner as described in relation of FIG. 4A (46), creating a depression in the blotting paper that corresponds to the wall of a sample grid holder such that the wall of the holder will fit within the depression. However, the additional central raised portion (56) of the template will create a central depression in the blotting paper in the area within the bounds of the peripheral depression (see e.g. FIG. 5B, items 50, 51). In this manner, a cavity (or dimple) is formed within the portion of the blotting paper that will protrude into the annulus of the sample grid holder with the purpose of creating some distance to the droplet on the grid surface in the centre of the grid while the paper is approaching the surface of the grid closely near the edge of the grid.

As discussed, alternative configurations of the template can be utilised depending on the ultimate profile desired in the blotting paper.

Furthermore, the profiles of the various projection(s) and/or indentation(s) of the template can be selected according to need. For example, one or more of the projection(s) and/or indentation(s) may comprising sharp edges, rounded edges, flat faces, non-flat faces, slanted edges, etc.

In some configurations of the present invention, the former can be part of a device that is used to prepare a sample for vitrification for subsequent analysis. In this manner, the profiled blotting paper can be prepared within the device as part of a method that ultimately results in sample vitrification.

Such devices comprise multiple components which can be modified to incorporate a template and holder. The skilled person will understand which parts of the device can be suitably modified to incorporate a template for forming a desired profile. Alternatively, an additional component (e.g. arm, rod, etc.) incorporating a template can be included in the device, which can be associated with the blotting arm in order to form the desired profile in the blotting paper. However, and as shown in FIGS. 3A, 4A, 5A, typically there exists a so-called shooting rod (100) which comprises tweezers (or similar) (102) that grip a sample grid holder. There also typically comprises a blotter arm/blotting paper holder (37, 47, 57) which, until now, is configured to hold a standard piece of blotting paper. Typically the shooting rod (100) will be moved to bring the sample grid (with or without holder) (104) to a predetermined position where the blotter arm with standard blotting paper can be moved to bring the standard blotting paper into contact with the sample grid/holder (see e.g. FIGS. 3B, 4B). Typically the blotter arm will have a compressible material, such as foam, to allow a gentle force to build up on the blotting paper. After the excess sample is removed from the grid the shooting rod will transfer the grid towards the cryo compartment in the device to rapidly cool down the sample.

It has been found that such a shooting rod can be modified to incorporate the desired template along its shaft (see FIGS. 3A, 4A, 5A).

Figure 7B:
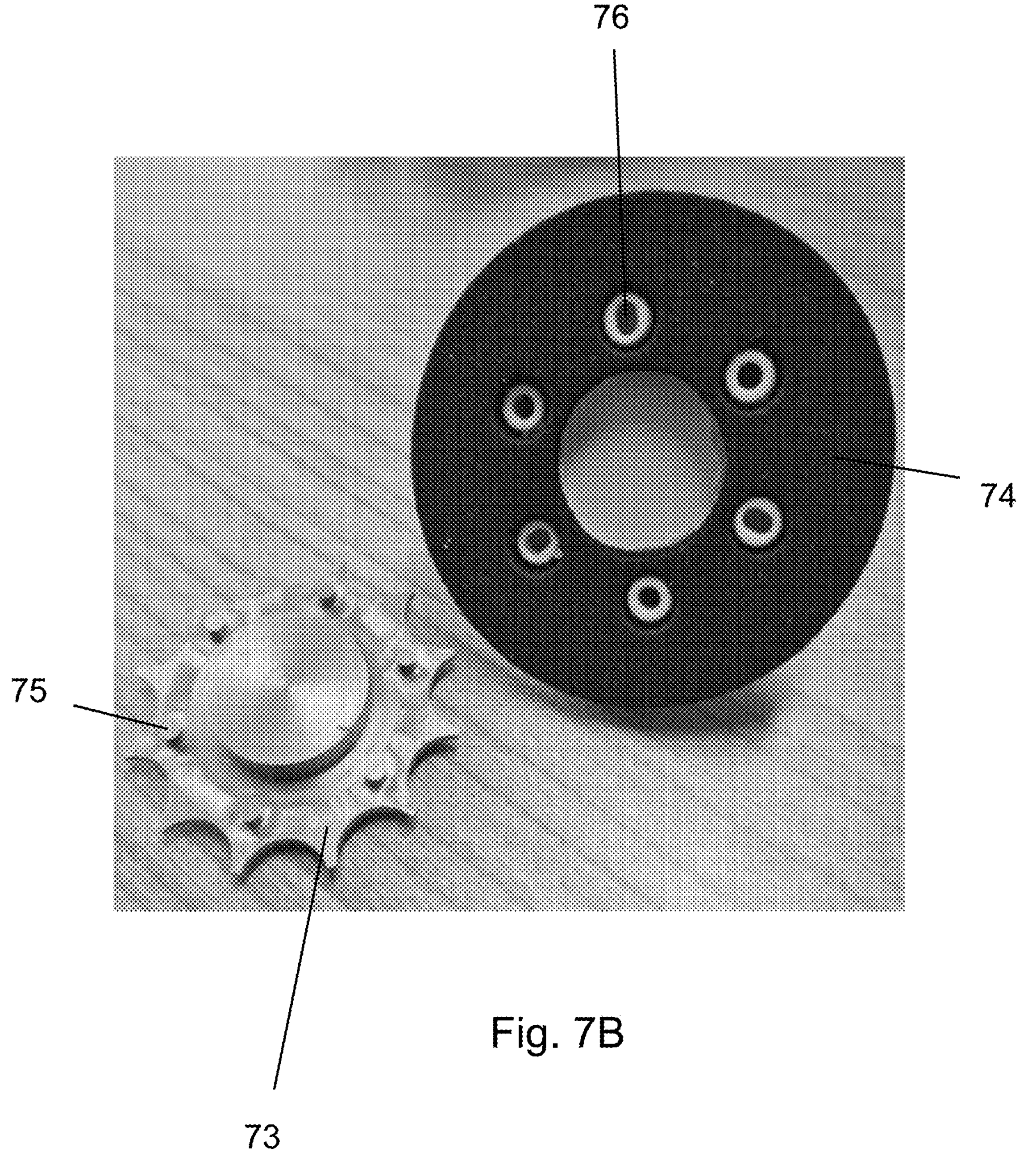
FIG. 7B shows an example of a paper clamp with alignment pins.

Furthermore, the blotting arm can be modified to comprise a means for holding the blotting paper (37, 47, 57), and can be designed to transfer sufficient force to the blotting paper onto the template when the blotting paper is pressed onto the template (or vice versa). This holder gives mechanical strength to the blotting paper so that a suitable profile can be created when pressure is applied against the template. Typically the holder will be able to hold the blotting paper in a secure manner so that it cannot become misaligned during the stamping process. This can be achieved by many means well known in the art, such as by clips, adhesive, etc. In one configuration, such as shown in FIG. 7B, the holder comprises a clamping ring (73) for clamping the paper (72) onto the holder (74). The blotting paper (72) is placed between the clamping ring (73) and the backing material (74), and the clamping ring is connected to the backing material. This can be carried out e.g. by friction (push) fit, or else can employ e.g. a screw fit or other suitable means.

In certain configurations, in order to ensure accurate alignment of the blotting paper on the holder, the holder or clamp may comprise one or more alignment pins (see FIG. 7B, 75). Although FIG. 7B shows a blotting paper holder/blotting arm comprising holes (76) in the backing material to accommodate alignment pins (75) present in the clamping member (73), this arrangement can be reversed such that the holder (74) comprises alignment pins (75) and the clamping member comprises holes to accommodate the pins. The pins and holes can also be present in both the backing material and the clamp in complementary arrangements. Preferably there are a plurality of alignment pins. The blotting paper (72) can therefore comprise one or more holes (71) which align with such alignment pins. Thus, the hole(s) and pin(s) are arranged in a manner which holds the blotting material in a desired position on the holder. This position is set so that the profiled regions on the blotting material will substantially correspond to a desired position of the blotting material on the holder, wherein such alignment of the blotting material onto the holder ensures rotational alignment of the profiles with respect to the grid.

In some configurations, particularly where the template is located on a shooting rod or alternative component in the preparation device and the blotting paper is loaded "plain" onto a holder (blotting arm), in order to create a desired profile in the blotting paper in a reliable manner, the holder can comprise a backing material (38, 48, 58) made from a material that is compressible. Such materials are well known in the art, and examples are foam, sponge, rubber, silicon, etc. The holder and backing material may made from the same or from different material, and/or the holder and backing material may be the same element. If the backing material is rigid enough to transmit suitable force to the blotting paper in order for a profile from the former template to be impressed into the paper then it may not be necessary to have an additional hard material present in order to suitable transmit force. However, if the compressible material is not rigid enough to transmit suitable force to the blotting paper, then it can be positioned between the blotting paper and the harder material of the holder.

In some configurations the blotting paper is attached to a compressible backing material. If the backing material is a different material from the holder, then the backing material can be attached to a harder material of the holder. However, it is possible to attach the blotting paper to the holder without physically attaching it to the backing material itself. The blotting paper will nevertheless be configured to make contact with the backing material (or vice versa) in such a configuration.

When force is applied to the holder (37, 47, 57) in order to bring the blotting paper into contact with the template, the harder material of the holder allows suitable force to be transmitted to the blotting paper. However, the compressible material (38, 48, 58) will allow the element(s) of the template to be forced into the blotting paper to a degree that gives the desired profile on the blotting paper.

In other configurations, the backing material of the blotting paper may be hard (i.e. not be compressible/flexible). In such arrangements, in order to obtain an accurate profile on the blotting paper, the backing material will preferably comprise a profile opposite to that of the template. Thus, the template is effectively pushed into the opposite profile on the holder, imparting the desired profile to the blotting paper which is sandwiched in between.

With the modified shooting rod comprising a desired template, a desired profile can be made in the blotting paper (e.g. a piece of blotting paper that would have typically been used for blotting according to standard techniques) by moving the shooting rod and/or blotting arm into a position where the blotting paper is aligned with the template. Thereafter the blotting paper is brought into contact with the template (either by moving the blotting arm towards the shooting rod, moving the shooting rod towards the blotting arm, or moving both towards each other) and suitable pressure is applied in order that the template forms the desired profile in the blotting paper.

Alternatively, an additional arm with template is moved towards the blotting arm and forms the profile into the paper.

Thereafter, the blotting arm and template (e.g. on the shooting rod) are moved away from each other, and the blotting arm (blotting paper holder) is left holding a piece of blotting paper with a desired profile.

In this manner, the profiled region can be made and aligned inside a single device making use of existing components and axes, avoiding introduction of new user handling steps.

Figure 7C:
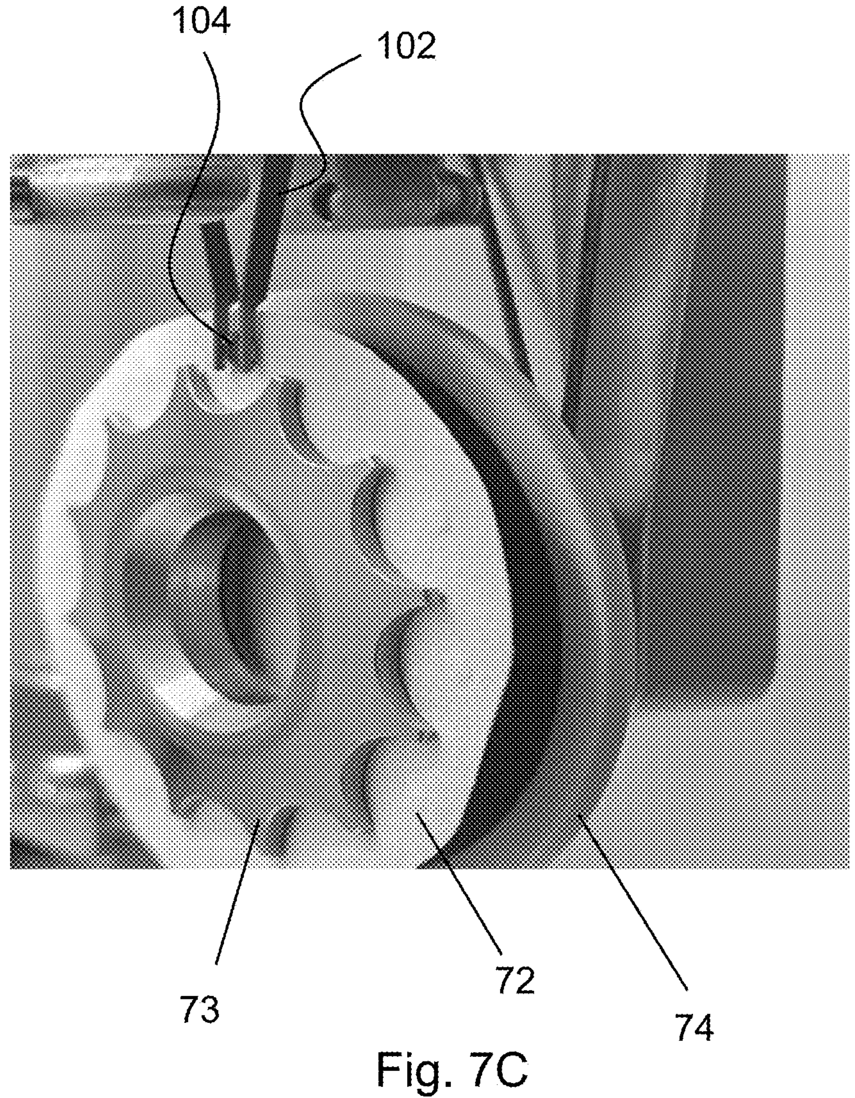
FIG. 7C shows an example of the paper clamp holding the blotting paper such that the bumps are aligned (rotation and height) with respect to the grid

In a subsequent step (which can either be a next step if the sample has already been applied to the grid, or else a future step once the sample has been applied), one or both of the shooting rod (100) and blotting arm (37, 47, 57) are moved to a position whereby a portion of the profiled region of the filter paper is able to protrude into the annulus of the sample grid holder in order to remove excess liquid (see FIGS. 3B, 4B, 7C).

Thus, there is also provided herein a method of blotting liquid from a sample grid using blotting paper comprising a profiled region, the profiled region having a portion configured to protrude at least partially into a space created within a boundary formed by the rim of a holder for a sample grid.

Irrespective of whether the profile on the blotting paper is made outside of a sample preparation device or within a sample preparation device, ultimately the blotting paper and sample grid holder need to be brought into proximity with each other such that the profiled region aligns with the sample grid holder so that a portion of the blotting paper can protrude into the annulus of the sample grid holder. Depending on the profile on the blotting paper, this may involve the rim of the sample grid holder entering a corresponding depression on the blotting paper. An example of the association of the sample grid holder with the profiled region on the blotting paper is shown in FIG. 7C. Here is shown the blotting paper (72) clamped in position on the blotting arm (74), with the tweezers (102) of the shooting rod holding a sample grid holder (104). The blotting paper and sample grid holder have been moved into association with one another in order to affect the removal of excess liquid from the sample grid. As also shown in FIGS. 7B and 7C, in certain arrangements the clamping member (73) can be profiled such that the tweezers can bring the sample grid holder (being held by the tweezers) into contact with the blotting material (72) without interference from the clamping means.

If alignment is attempted manually, outside of a sample preparation device, then it may be impossible to align the profiled region and grid holder by eye. For example, the alignment of the profiled region and the depth to which the blotting paper protrudes into the annulus of the sample grid holder generally need to be tuned to the position and orientation of the sample grid holder. Thus, to be able to align the profiled region on the blotting paper more reliably than by eye, various modifications to the sample preparation device can be made.

For example, the x-, y-, z- and rotational axes of the shooting rod and/or blotting arm (paper holder) can be used to minimize alignment errors between the profiled region on the blotting paper and the sample grid holder. Typically the z-axis (up/down) of the shooting rod is used along with optional rotation in order to accurately align the components.

In some arrangements the alignment of a profiled region on an empty sample grid holder (e.g. a sample grid holder without loaded sample grid, or a sample grid holder with loaded sample grid but without loaded sample) can be used for alignment by the user when placing the paper before use on an actual sample.

In some arrangements, a visual guide such as a dot of light can be projected onto the profiled blotting paper (via a light source, such as a laser) to assist the user to locate the profiled region appropriately. For example, the light can be aligned with the sample grid holder when the holder is in position. Thereafter, the sample grid holder can be retracted and the light is projected onto the blotting paper. Since the position of the light effectively highlights the position of the sample grid holder, the profiled region on the blotting paper can then be aligned appropriately with respect to the light.

Figures 6A, 6B:
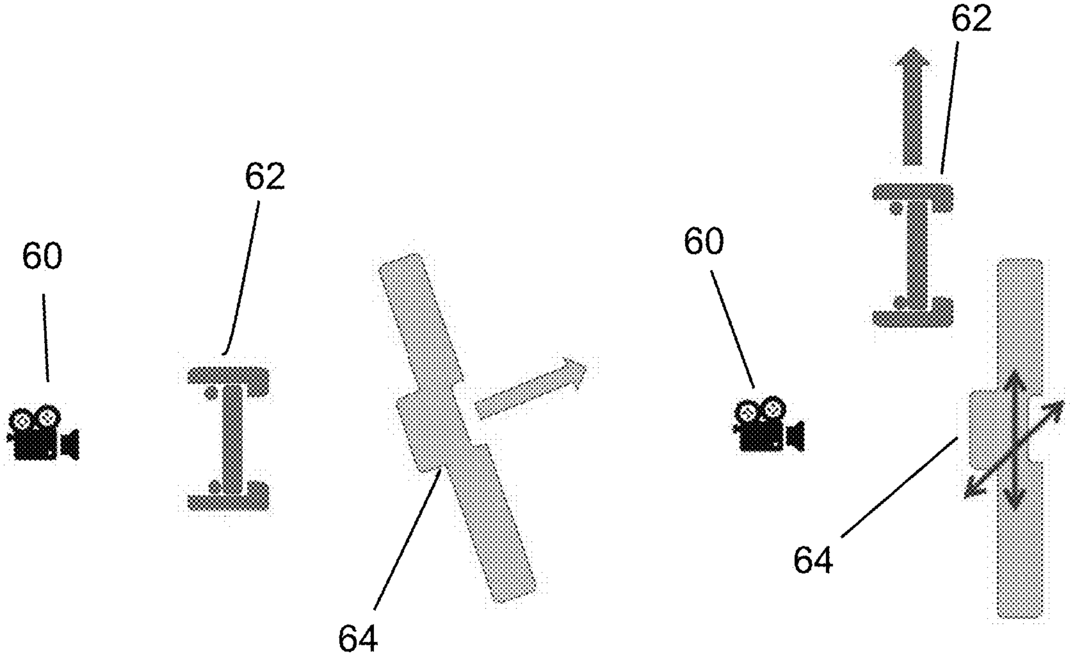
FIG. 6A shows an example of a camera being used to register the position of a sample grid holder when a blotting arm is retracted.
FIG. 6B shows an example of a camera being used to assist alignment of the profiled region of a piece of blotting paper with the shooting rod retracted.

As shown in FIGS. 6A and 6B, in some arrangements a camera (60) can be used to view the position of the profiled region of the blotting paper (64) with respect to the sample grid holder (62). This can be conducted, as described above, with an empty sample grid holder to achieve correct alignment before a sample is present (see e.g. FIG. 6A). In some methods, a camera (60) can be used to overlay the image of a previously positioned sample grid holder (62) (see FIG. 6A, with blotting paper out of image) with the image of the profiled region of the blotting paper (see FIG. 6B, with sample grid holder out of image), or vice versa. Thereafter, the blotting paper and/or sample grid holder can be aligned without the other being present before the sample grid holder and blotting paper are ultimately brought into contact with one another.

An advantage of using a camera is that such calibrations can be automated using appropriate software.

Thus, there is also taught herein a system for aligning a profiled piece of blotting paper as described herein with a sample grid holder, said system comprising:

- a means for gripping a sample grid holder (e.g. tweezers, optionally associated with a driving rod);
- a blotting paper holder configured to hold said profiled blotting paper;
- means for adjusting the position of the blotting paper and/or the sample grid holder relative to each other (e.g. along x-, y-, z-, rotational axes) such that the portion of the blotting paper configured to protrude at least partially into a space created within a boundary formed by the rim of the sample grid holder is able to protrude therein when the blotting paper is brought into association with the sample grid holder; and
- means for bringing the blotting paper into association with said sample grid holder (e.g. so that any excess liquid on the sample grid can be wicked away).

In some arrangements, when moving the profiled region of the blotting paper closer to the grid surface, the contact between the blotting paper and the grid surface can be sensed by measuring the force on the grid or paper. The skilled person will be aware of suitable sensors that can be utilised, such as pressure sensors integrated in the blotting arm or strain gauges attached to the driving rod or gripper of the sample holder.

Moreover, automation of the blotting (wicking) process can provide for a position-speed profile, which allows controlled rapid wicking of the bulk of the sample followed by a more gentle closure of the gap between the blotting paper and the grid to remove the remaining liquid until the required thickness is obtained.

The present disclosure therefore presents the following subject-matter:

E1. Blotting material comprising a profiled region that has a portion configured to protrude at least partially into a space created within a boundary formed by the rim of a holder for a sample grid.

E2. The blotting material of E1, wherein the profiled region comprises an indentation.

E3. The blotting material of E1 or E2, wherein the portion of the blotting material configured to protrude into the space of the holder is equal to or less than approximately 3 mm in diameter or longest dimension.

E4. The blotting material of any one of the preceding clauses, wherein the portion of the blotting material configured to protrude into the space of the holder has a height of between approximately 25 μm to approximately 500 μm as measured from the plane of the outer surface of the holder.

E5. The blotting material of any one of the preceding clauses, wherein the profiled region comprises a diameter or longest dimension of approximately 5 mm.

E6. The blotting material of any one of the preceding clauses, wherein the blotting material comprises a surface that is configured to contact an outer surface of the holder, thereby creating a stop to prevent the portion configured to protrude at least partially into the space from protruding further.

E7. The blotting material of any one of the preceding clauses, wherein substantially the whole of the profiled region comprises an area that protrudes from a major plane of the blotting material.

E8. The blotting material of any one of the preceding clauses, wherein the profiled region comprises a peripheral portion that is depressed into the major plane of the paper.

E9. The blotting material of any one of the preceding clauses, wherein the portion configured to protrude at least partially into a space created within a boundary created by the rim of a holder for a sample grid further comprises an indentation.

E10. The blotting material of any one of the preceding clauses, wherein the portion of the blotting material configured to protrude into the space of the holder is dimensioned to make contact with the holder wall.

E11. The blotting material of any one of the preceding clauses, wherein the blotting material comprises a plurality of profiled portions.

E12. The blotting material of any one of the preceding clauses, wherein the blotting material comprises at least one hole that is configured to align the blotting material on a holder.

E13. A method of removing fluid from a sample grid held in a sample grid holder, said method comprising:

bringing a blotting material according to any one of E1 to E12 and the sample grid holder into association with one another such that the portion of the profiled region configured to protrude at least partially into a space created within a boundary formed by the rim of the sample grid holder protrudes therein, thereby bringing the blotting paper into contact with any liquid present within the boundary created by the rim of the sample grid holder or on the sample grid.

E14. The method of E13, wherein the method comprises aligning said profiled region with the sample grid holder prior to bringing the blotting material and sample grid holder together.

E15. The method of E13 or E14, wherein the method comprises aligning said blotting material on a holder for said blotting material prior to bringing the blotting material and sample grid holder together, optionally wherein aligning said blotting material on a holder comprises aligning holes on said blotting material with alignment pins associated with said holder.

E16. The method of any one of E13 to E15, wherein the sample grid holder is connected to a component of a preparation device (e.g. a shooting rod), and wherein the component (e.g. shooting rod) is able to be moved into a desired position along x, y, z axes and/or by rotation around its longitudinal axis.

E17. The method of any one of E13 to E16, wherein the blotting material is held on a holder for said blotting material, and wherein the holder is able to be moved into a desired position along x, y, z axes and/or by rotation around its longitudinal axis.

E18. The method according to any one of E13 to E17, wherein the profiled region of the blotting material is aligned with a sample grid holder with or without sample grid but without sample, prior to bringing the blotting material into contact with a sample grid holder loaded with sample grid and sample.

E19. The method according to any one of E13 to E18, wherein alignment is assisted by use of a camera.

E20. The method of E19, further comprising:

moving a sample grid holder into position;

taking an image of said sample grid holder in the position;

optionally storing said image;

moving the sample grid holder away from position;

introducing said profiled blotting material into position;

overlaying the previous image of the sample grid holder on the image of the profiled blotting material; and aligning said blotting material with the image of the sample grid holder.

E21. The method of E20, wherein the sample grid holder is subsequently brought back to the position where its image was previously taken, and thereafter bringing the blotting material and sample grid holder into association with one another.

E22. A system for aligning blotting material according to any one of E1 to E12 with a sample grid holder, said system comprising:

a means for gripping the sample grid holder;

a holder configured to hold said blotting material;

means for adjusting the position of the blotting material and/or the sample grid holder relative to each other such that the portion of the blotting material configured to protrude at least partially into a space created within a boundary formed by the rim of the sample grid holder is able to protrude therein when the blotting material is brought into association with the sample grid holder; and means for bringing the blotting material into association with said sample grid holder.

E23. The system of E22, further comprising a camera.

E24. The system of E23, wherein the camera is able to take an image of the sample grid holder in position while the blotting material is not in position, the system further comprising means to overlay that image on an image of the blotting paper in order to align the blotting material with the overlaid image, or vice versa.

E25. The system according to any one of E22 to E24, wherein the system comprises means for aligning said blotting material with said holder configured to hold said blotting material.

E26. The system according to E25, wherein the means for aligning comprises one or more holes in the blotting material and one or more corresponding pins in said holder.

E27. The system according to E26, wherein the one or more pins are present in a backing material of said holder, or are present in a clamp used to secure the blotting material to the backing material, or a present in both the backing material and the clamp.

E28. A former for creating a profile on blotting material according to any one of E1 to E12, the former comprising a template with a profile that is opposite to that of the desired profile of the blotting material such that when said former contacts said blotting material with suitable pressure a profiled region is created in the blotting material comprising a portion configured to protrude at least partially within the boundary created by the rim of a holder for a sample grid.

E29. The former of E28, wherein the template comprises at least one indentation.

E30. The former of E28 or E29, wherein the template comprises at least one raised portion.

E31. The former of E30, wherein at least one raised portion is a peripheral raised portion.

E32. The former of E30 or E31, wherein at least one raised portion is centrally located, or substantially centrally located.

E33. The former of any one of E28 to E32, wherein the former comprises means for holding the blotting material.

E34. The former of E33, wherein the means for holding the blotting material comprises a compressible material.

E35. The former of any one of E28 to E34, wherein the former is a stand-alone device.

E36. The former of any one of E28 to E34, wherein the former is part of a device used to prepare a sample for vitrification for subsequent analysis.

E37. The former of E36, wherein the device comprises a shooting rod used to position a sample grid or a sample grid holder, and where the template of the former is associated with the shooting rod.

E38. A method for forming a profile in a piece of blotting material, the method comprising bringing a piece of blotting material into contact with a template on a former according to any one of E28 to E37 and applying suitable pressure to impart the profile of the template into the blotting material.

The invention claimed is:

1. A system for aligning blotting material with a sample grid holder, said system comprising:

a means for gripping the sample grid holder;

a holder configured to hold a blotting material;

a means for adjusting a position of the blotting material and/or the sample grid holder relative to each other such that a portion of the blotting material that is configured to protrude at least partially into a space created within a boundary formed by a rim of the sample grid holder is able to protrude therein when the blotting material is brought into association with the sample grid holder, wherein the blotting material comprises a profiled region that has a portion configured to protrude at least partially into the space created within the boundary formed by the rim of the sample grid holder, and wherein the blotting material comprises a first area that is greater than a second area formed by the rim of the sample grid holder;

a means for bringing the blotting material into association with said sample grid holder, and wherein the portion of the blotting material configured to protrude into the space of the holder has a height of between approximately 25 μm to approximately 500 μm as measured from a plane of the outer surface of the holder.

2. The system of claim 1, further comprising a camera, optionally wherein the camera is able to take an image of the sample grid holder in position while the blotting material is not in position, and wherein the camera is configured to overlay the image of the sample grid holder on an image of the blotting paper in order to align the blotting material with the overlaid image, or vice versa.

3. The system according to claim 1, wherein the system comprises means for aligning said blotting material with said holder configured to hold said blotting material.

4. The system according to claim 3, wherein the means for aligning comprises one or more holes in the blotting material and one or more corresponding pins in said holder, optionally wherein the one or more pins are present in a backing material of said holder, or are present in a clamp used to secure the blotting material to the backing material, or a present in both the backing material and the clamp.

5. The system according to claim 1, wherein the portion of the blotting material configured to protrude into the space of the holder:

is equal to or less than approximately 3 mm in diameter.

6. The system according to claim 1, wherein the profiled region comprises a diameter of approximately 5 mm.

* * * * *